US007399164B2

(12) United States Patent
Scharl

(10) Patent No.: US 7,399,164 B2
(45) Date of Patent: Jul. 15, 2008

(54) TURBINE ENGINE AND BLADED ROTOR FOR A COMPRESSION STAGE OF A TURBINE ENGINE

(75) Inventor: Richard Scharl, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 261 days.

(21) Appl. No.: 10/576,917

(22) PCT Filed: Oct. 2, 2004

(86) PCT No.: PCT/DE2004/002192

§ 371 (c)(1),
(2), (4) Date: Apr. 24, 2006

(87) PCT Pub. No.: WO2005/045200

PCT Pub. Date: May 19, 2005

(65) Prior Publication Data

US 2007/0134100 A1 Jun. 14, 2007

(30) Foreign Application Priority Data

Oct. 31, 2003 (DE) ................................ 103 51 092

(51) Int. Cl.
*F03D 11/04* (2006.01)
*F01D 5/30* (2006.01)

(52) U.S. Cl. ....................................... 416/215; 416/216

(58) Field of Classification Search ................. 416/215, 416/216, 217, 218, 222
See application file for complete search history.

(56) References Cited

U.S. PATENT DOCUMENTS

| | | | | |
|---|---|---|---|---|
| 3,597,112 | A | 8/1971 | Garten | 416/215 |
| 3,778,191 | A * | 12/1973 | Brockmann | 416/215 |
| 6,152,698 | A * | 11/2000 | Gregg et al. | 416/215 |
| 6,471,483 | B2 * | 10/2002 | London | 416/215 |
| 2005/0129521 | A1 * | 6/2005 | Naudet | 416/215 |

FOREIGN PATENT DOCUMENTS

| | | |
|---|---|---|
| DE | 39 19 233 | 5/1990 |

* cited by examiner

*Primary Examiner*—Edward Look
*Assistant Examiner*—Dwayne J White
(74) *Attorney, Agent, or Firm*—Davidson, Davidson & Kappel, LLC

(57) ABSTRACT

A turbine engine and a rotor for a turbine engine are provided. Several adjacent turbine blades are positioned in the circumferential direction of the rotor, each turbine blade having a blade root, each turbine being fixed in a retainer groove, running in the circumferential direction of the rotor, by means of the blade root. Each turbine blade may be introduced, by the blade roots thereof, into the retaining groove, by means of a filling groove, whereby the width of the filling groove is matched is matched to the width of the blade roots. The width of the blade roots (13, 14) and the width of the, or each filling groove (17) in the circumferential direction is greater than half the width of a desired nominal blade pitch (18), whereby in the region of the, or each filling groove (17), a first number of turbine blades (11) with desired nominal blade pitch (18), is exchanged for a second number of turbine blades (12), with increased blade pitch (19), the first number being greater than the second number.

16 Claims, 1 Drawing Sheet

TURBINE ENGINE AND BLADED ROTOR FOR A COMPRESSION STAGE OF A TURBINE ENGINE

FIELD OF THE INVENTION

The present invention relates to a turbine engine, and a gas turbine in particular. Furthermore, the present invention relates to a rotor for a compression stage of a turbine engine.

BACKGROUND

In turbine engines, gas turbines in particular, it is known to mount the turbine blades on a rotor in the compressor of the turbine engine in such a way that the turbine blades with their blade roots are held and thus secured in a retainer groove which runs in the circumferential direction, i.e., surrounding the rotor in the circumferential direction. A rotor design for securing the turbine blades having a retainer groove that runs in the circumferential direction is also referred to as circumferential groove rotor design or circumferential groove blade design. A filling groove is used for introducing the blade roots into the correspondingly designed retainer groove. The filling groove is dimensioned in such a way that the turbine blades with their blade roots may be pivoted into the filling groove in order to be subsequently displaced in the retainer groove in the circumferential direction. It is thus already related art that the width of the filling groove is adapted to the width of the turbine blades' blade roots.

Since, due to high rotational speeds, the turbine blades are exposed to high mechanical stresses during operation of the rotor, i.e., the turbine engine, it is important that the blade roots, in the area of a blade collar in particular, have a sufficiently large cross section and thus sufficient stability. Since the width of the filling groove must be adapted to the width of the blade roots and, furthermore, no blade root is allowed to protrude into the filling groove after assembly of the turbine blades in the retainer groove of the rotor, the turbine blades have blade roots, according to the related art, which have a width of at most one-half of the blade pitch. Viewed in the circumferential direction of the rotor, the blade pitch is understood to be the spacing of the turbine blades over the circumference of the rotor due to the circumferential extension of the turbine blades.

SUMMARY OF THE INVENTION

Based on these facts, the object of the present invention is to create a novel turbine engine as well as a novel rotor for a compression stage of a turbine engine.

According to the present invention, the width of the blade roots and the width of the one or each filling groove in the circumferential direction are greater than one-half of the width of a desired or nominal blade pitch, a first number of turbine blades having a desired blade pitch being replaced in the area of the one or each filling groove for a second number of turbine blades having an increased blade pitch, and the first number being greater than the second number.

According to an advantageous refinement of the present invention, multiple filling grooves are evenly distributed over the circumference of the rotor, the width of each filling groove in the circumferential direction being greater than one-half of the width of a desired, nominal blade pitch, and a first number of turbine blades having a desired, nominal blade pitch being replaced in the area of each filling groove by a second number of turbine blades having an increased blade pitch, and the first number being greater than the second number.

Three turbine blades having a desired blade pitch are preferably replaced in the area of the one or each filling groove by two turbine blades having an increased blade pitch.

BRIEF DESCRIPTION OF THE DRAWINGS

An exemplary embodiment of the present invention is, without being limited thereto, explained in greater detail on the basis of the drawing.

DETAILED DESCRIPTION

Figure 1:
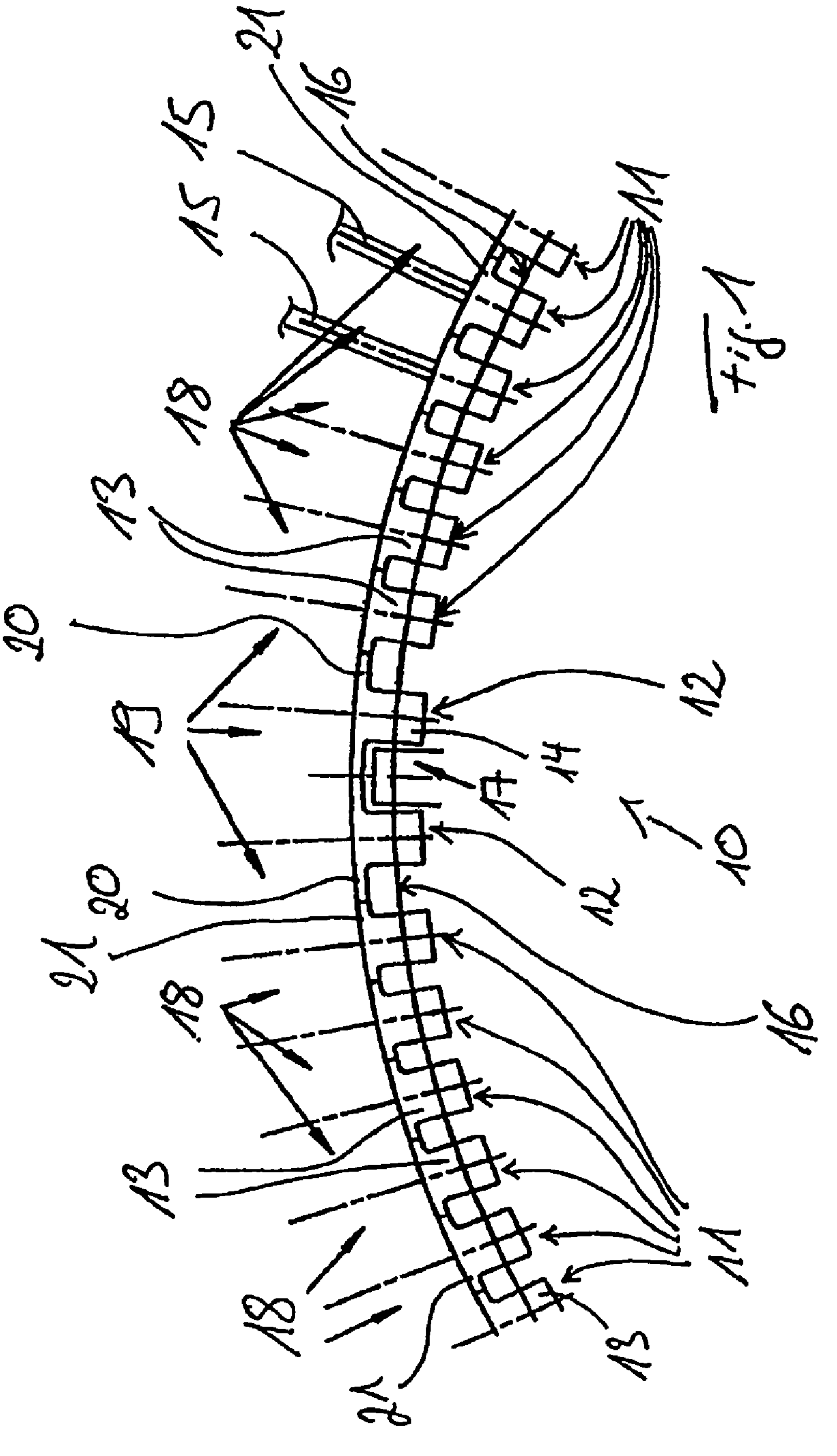
FIG. 1 shows a highly schematic representation of a detail of a rotor according to the present invention for a compression stage of a turbine engine.

The present invention is described in greater detail in the following with reference to FIG. 1. FIG. 1 shows a detail of a rotor 10 of a compressor of a turbine engine, a gas turbine in particular. According to FIG. 1, multiple turbine blades 11 and 12 are situated side by side in the circumferential direction of rotor 10. FIG. 1 is a highly schematic representation so that FIG. 1 only shows the blade roots 13 and 14 of turbine blades 11 and 12. Blade roots 15 are indicated on the right edge of FIG. 1 for two turbine blades 11 only.

Turbine blades 11 and 12 with their blade roots 13 and 14 are secured in a retainer groove extending in the circumferential direction of rotor 10. This retainer groove is represented in FIG. 1 by a line indicated by reference numeral 16.

A filling groove 17 is situated in the area of the circumferential section of rotor 10 represented in FIG. 1. Turbine blades 11 and 12 with their blade roots 13 and 14 are insertable into retainer groove 16 via filling groove 17. The width of filling groove 17 is adapted to the width of blade roots 13 and 14.

It is the purpose of the present invention to deviate from the construction principle, required according to the related art, that the circumferential extension of the blade roots may correspond to at most one-half of the nominal or desired blade pitch.

According to the present invention, turbine blades 11 having a desired, nominal blade pitch and turbine blades 12 having an increased blade pitch are situated in retainer groove 16 of rotor 10. The width of blade roots 13 and 14 of both types of turbine blades 11, 12 is the same and adapted to the width of filling groove 17. A first number of turbine blades 11 having a desired, nominal blade pitch are replaced in the area of the filling groove by a second number of turbine blades 12 having an increased blade pitch, the first number being greater than the second number. In the shown exemplary embodiment, two turbine blades 12 having an increased blade pitch are situated in the area of filling groove 17 instead of three turbine blades 11 having a desired, nominal blade pitch. This makes it possible that a plurality of turbine blades 11 may be positioned along the circumference of rotor 10 whose blade roots 13 have a circumferential extension which is greater than one-half of the nominal or desired blade pitch. Only in the area of filling groove 17 are turbine blades 12 provided having a greater blade pitch or blade roots 14 whose circumferential extension corresponds to one-half of the increased blade pitch to ensure that blade roots 14 of the turbine blades do not protrude into the area of filling groove 17 after assembly. The areas of the rotor in which turbine blades 11 having the desired, nominal blade pitch are situated are indicated in FIG. 1 by reference numeral 18 and the areas having an increased blade pitch are indicated by reference numeral 19.

Due to the above-described construction principle according to the present invention, it is possible to position multiple turbine blades having a smaller blade pitch along the circumference of rotor 10 in retainer groove 16 which runs in the circumferential direction and at the same time obtain greater stability and stressability of the turbine blades due to an increase in the circumferential extension and the width of the blade roots in the circumferential direction.

A filling groove 17 including turbine blades 12, having an increased blade pitch compared to the desired, nominal blade pitch, positioned in the area of filling groove 17 is depicted in the detail of rotor 10 shown in FIG. 1. It is the object of the present invention to position multiple such filling grooves 17 over the circumference of the rotor, filling grooves 17 being uniformly distributed over the circumference of rotor 10. In the case of two filling grooves it would mean that the filling grooves are facing each other diametrically. This ensures symmetry over the circumference of the rotor, which is advantageous with regard to the prevention of imbalances and the prevention of asymmetrical stresses on rotor 10.

As can be seen in FIG. 1, turbine blades 12, having an increased blade pitch compared to turbine blades 11 having a desired, nominal blade pitch, have a larger platform area 20. In the depicted exemplary embodiment, platform area 20 of turbine blades 12 having the increased blade pitch is 50% larger than a platform area 21 of turbine blades 11 having the nominal blade pitch.

What is claimed is:

1. A turbine engine, comprising:

a compression stage including a rotor and a plurality of turbine blades positioned side by side in a circumferential direction of the rotor, each turbine blade having a blade root, each turbine blade being securable via the blade root in a retainer groove which extends in the circumferential direction of the rotor, each turbine blade being insertable with its blade roots into the retainer groove via a filling groove, the width of the blade roots and the width of the filling groove being greater in the circumferential direction than one-half of the width of a desired, nominal blade pitch;

wherein the plurality of turbine blades include a first plurality of turbine blades and a second plurality of turbine blades, the first plurality of turbine blades having the desired, nominal blade pitch and the second plurality of turbine blades having a blade pitch greater than the desired nominal blade pitch, the second plurality of turbine blades being in an area of the filling groove, the first plurality being greater in number than the second plurality.

2. The turbine engine as recited in claim 1, comprising a plurality of compression stages.

3. The turbine engine as recited in claim 1, comprising a plurality of filling grooves.

4. The turbine engine as recited in claim 3, wherein the plurality of filling grooves are uniformly distributed over the circumference of the rotor, the width of each filling groove being greater in the circumferential direction than one-half of the width of a desired, nominal blade pitch, and, for each filling groove, the first plurality of turbine blades have the desired, nominal blade pitch and the second plurality of turbine blades have a blade pitch greater than the desired nominal blade pitch, the second plurality of turbine blades being in an area of the filling groove, the first plurality being greater in number than the second plurality.

5. The turbine engine as recited in claim 1, comprising two filling grooves facing one another diametrically.

6. The turbine engine as recited in claim 1, wherein three turbine blades having the desired, nominal blade pitch can be replaced in the area of the filling groove by two turbine blades having the increased blade pitch.

7. The turbine engine as recited in claim 1, wherein the second plurality of turbine blades having an increased blade pitch have an enlarged platform area in the circumferential direction compared to the first plurality of turbine blades having the desired, nominal blade pitch.

8. The turbine engine as recited in claim 1, wherein the width of the filling groove in the circumferential direction corresponds approximately to one-half of the width of the increased blade pitch.

9. A rotor for a compression stage of a turbine engine, comprising:

a plurality of turbine blades positioned side by side in a circumferential direction of the rotor, each turbine blade having a blade root, each turbine blade being securable via the blade root in a retainer groove which extends in the circumferential direction of the rotor, each turbine blade being insertable with its blade roots into the retainer groove via a filling groove, the width of the blade roots and the width of the filling groove being greater in the circumferential direction than one-half of the width of a desired, nominal blade pitch;

wherein the plurality of turbine blades include a first plurality of turbine blades and a second plurality of turbine blades, the first plurality of turbine blades having the desired, nominal blade pitch and the second plurality of turbine blades having a blade pitch greater than the desired nominal blade pitch, the second plurality of turbine blades being in an area of the filling groove, the first plurality being greater in number than the second plurality.

10. The rotor as recited in claim 9, comprising a plurality of compression stages.

11. The rotor as recited in claim 9, comprising a plurality of filling grooves.

12. The rotor as recited in claim 11, wherein the plurality of filling grooves are uniformly distributed over the circumference of the rotor, the width of each filling groove being greater in the circumferential direction than one-half of the width of a desired, nominal blade pitch, and, for each filling groove, the first plurality of turbine blades have the desired, nominal blade pitch and the second plurality of turbine blades have a blade pitch greater than the desired nominal blade pitch, the second plurality of turbine blades being in an area of the filling groove, the first plurality being greater in number than the second plurality.

13. The rotor as recited in claim 9, comprising two filling grooves facing one another diametrically.

14. The rotor as recited in claim 9, wherein three turbine blades having the desired, nominal blade pitch can be replaced in the area of the filling groove by two turbine blades having the increased blade pitch.

15. The rotor as recited in claim 9, wherein the second plurality of turbine blades having an increased blade pitch have an enlarged platform area in the circumferential direction compared to the first plurality of turbine blades having the desired, nominal blade pitch.

16. The rotor as recited in claim 9, wherein the width of the filling groove in the circumferential direction corresponds approximately to one-half of the width of the increased blade pitch.

* * * * *